No. 735,314. PATENTED AUG. 4, 1903.
R. H. SYMS.
DECOY.
APPLICATION FILED OCT. 28, 1901.
NO MODEL.
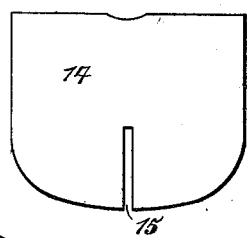
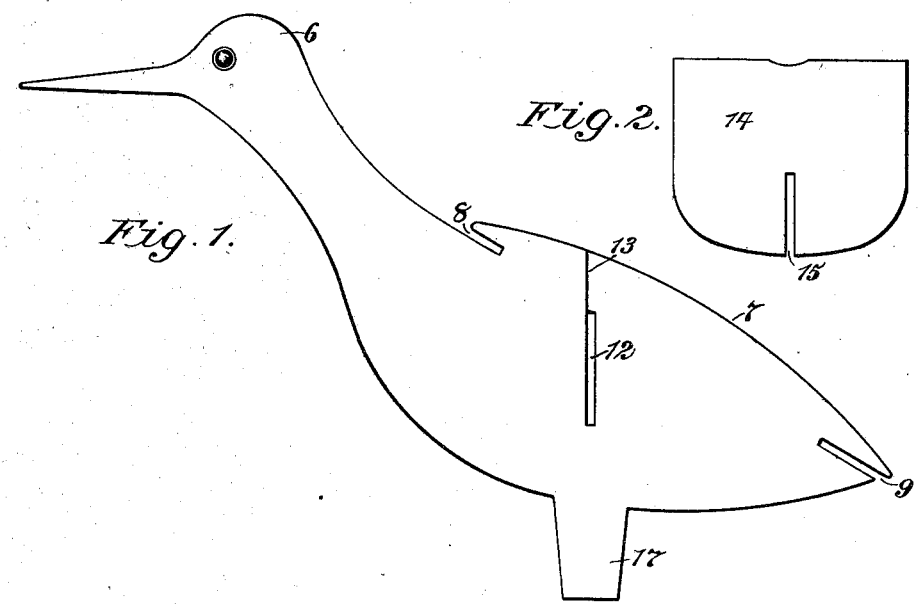
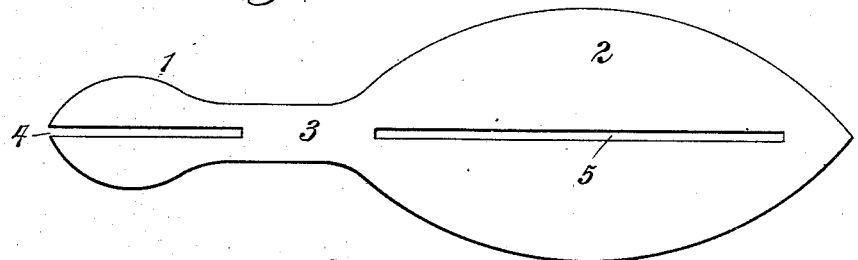
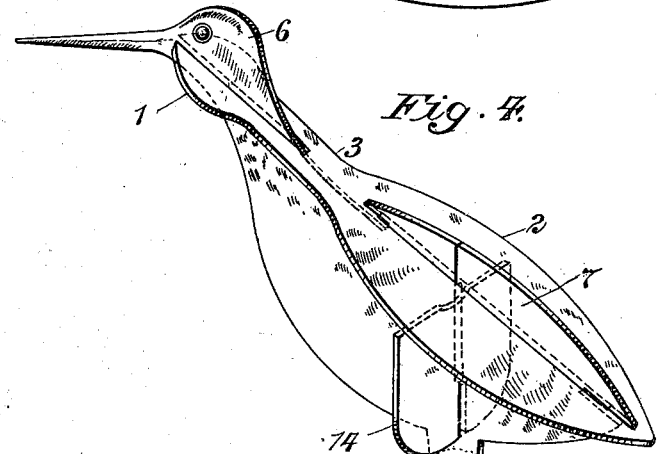
Witnesses
Edward Rowland
Samuel C. E. Carpenter
Robert H. Syms
Inventor
By his Attorney
H. H. MacKay No. 735,314. Patented August 4, 1903.

UNITED STATES PATENT OFFICE.

ROBERT H. SYMS, OF NEW YORK, N. Y.

DECOY.

SPECIFICATION forming part of Letters Patent No. 735,314, dated August 4, 1903.

Application filed October 28, 1901. Serial No. 80,225. (No model.)

*To all whom it may concern:*

Be it known that I, ROBERT H. SYMS, a citizen of the United States, residing in the city, county, and State of New York, have invented a certain new and useful Improvement in Decoys, whereof the following is a specification.

My present invention has relation to decoys made of flat sheets, preferably of metal, and adapted to be taken apart or folded together, so as to form a flat bundle occupying a small compass for convenience in carrying about.

It is the principal object of my invention to produce a perfectly efficient and satisfactory form of knockdown decoy which shall require no hinges or equivalents, shall be capable of manufacture at a minimum cost, and be composed of replaceable parts easily assembled whenever desired.

A preferred form of my invention is illustrated in the accompanying drawings, wherein—

Figure 1 is a side view of the profile-piece. Fig. 2 shows one form of brace. Fig. 3 is a plan view of the back-piece. Fig. 4 is a perspective view of my decoy as assembled.

Flat decoys have been hitherto made in a single piece presenting the general outline of a profile view of the bird. The objection to these is that although presenting a deceptive appearance to birds on either side they are practically invisible to birds approaching in the plane of the decoy. It is usual to employ decoys in groups, all facing the same way. Birds in approaching these usually fly directly over them and then downward from behind, so as to face with the decoys. Where plain flat decoys are used, the birds which may have been attracted by the side view lose sight of the decoys altogether in flying over them, and these devices are therefore not found efficient. It is thus desirable to so construct the decoy that the plan view of a bird will be imitated as well as a side profile. It is a broad feature of my invention that this is accomplished successfully without the use of parts capable of getting out of order. For this purpose I employ two principal sections, (shown, respectively, in Figs. 1 and 3.) These are preferably stamped out of sheet metal to the proper shape and then painted or otherwise marked to simulate the appearance of the desired bird. These two operations complete the device in its simplest embodiment, thus reducing the manufacturing expenses to a minimum, since the stampings can be made rapidly and the markings, being applied to a flat surface, can be properly adjusted by machinery.

The profile-piece (shown in Fig. 1) is designed to stand vertically and presents any desired general shape—such, for instance, as shown in the drawing. The back-piece is shown in Fig. 3. It should be shaped to simulate the general outline of a bird in top view and includes, preferably, a head 1 and a body 2, joined by a neck 3. The preferred form of my invention involves a straddling of the profile-piece by the back-piece and the provision of means whereby the former projects symmetrically through the latter. In the form shown the back-piece has two slots, one at 4 in the head and the other at 5 in the body. The head 6 of the profile-piece projects through the slot 4 and the curve of the back 7 projects through the slot 5. A variety of means may be employed for securing the parts in these relations without departing from the spirit of my invention. I prefer the means shown, where slots are provided, as at 8 and 9, at the two ends of the back-curve 7 in the profile-piece, these slots being adapted to receive the back-piece, as illustrated in Fig. 4, where the parts are shown assembled. In adjusting the back-piece to its place it is first slipped forward into the slot 9 at the tail, the slot 5 going over the curve 7. Then it is slipped backward far enough to enter the slot 8. In this position the slot 4 passes over the head 6. The essential parts of the decoy are then in place ready for use. Of course any desired additional means may be used to lock the parts in this position where thought best; but this is not essential. Where it is desired to firmly hold the parts against distortion by the wind, for instance, I prefer to employ a brace, and that shown in the drawings will be found suitable. For this purpose a slot 12 is made in the profile-piece, communicating with the outer edge by the cut 13. The bracing-piece 14 has a slot 15 dividing it symmetrically and designed to permit the brace to straddle the profile-piece when in place. To assemble a braced decoy, as shown in Fig. 4, the cut 13 is slightly opened by bending the material, so as to admit the brace 14 to the position shown in the drawings. The back-piece is then adjusted, as above described, and the decoy is ready.

By inserting the profile-piece in the end of a split stick, as 16, it can be put up in the ground anywhere. For this purpose it would be well to supply an offset 17 on the bottom of the profile-piece.

A decoy of this character is easily taken apart or put together. It is very light and it takes up very little space. The pieces comprise no delicate parts to become broken or disarranged, and even if one or another piece is lost it can be easily replaced. The whole can be collapsed without taking apart if the various slots are made to fit loosely. This is done by turning the brace 14 down either way against the profile-piece and then tilting the back-piece down upon both. This is facilitated by using resilient metal for the various pieces or sections.

The precise arrangement of parts shown and described herein is not to be understood as essential to the spirit of my invention.

What I claim is—

1. In a decoy, a sheet-metal profile-piece and a separable and independent flat sheet-metal back-piece, said profile-piece having a slot at the tail end and the back-piece having a slot fitting over said profile-piece when the back-piece is slid into said slot in the profile-piece.

2. In a decoy, a sheet-metal profile-piece having a slot at the tail and an opening in the body, a separable and independent flat sheet-metal back-piece having a slot fitting over said profile-piece when the back-piece is slid into the slot on the profile-piece and a sheet-metal brace adapted to pass through the opening in the body of the profile-piece and support said back-piece.

3. In a decoy, a sheet-metal profile-piece having a head portion and an upwardly-extending back-curve; in combination with a single separable and independent flat sheet-metal back-piece having two slots fitting respectively over said head portion and back-curve so that said back-piece is directly supported by said profile-piece.

4. In a decoy, a profile-piece having a slot opening to the edge thereof by a cut; in combination with a back-piece fitting on said profile-piece and a brace adapted to pass through said slot and straddle said profile-piece.

ROBERT H. SYMS.

Witnesses:
W. C. SIMMONS,
HELEN E. ENGLISH.